US012123593B2

(12) United States Patent
Khan et al.

(10) Patent No.: US 12,123,593 B2
(45) **Date of Patent: *Oct. 22, 2024**

(54) VARIABLE FEED ENCLOSED COMBUSTOR SYSTEM AND METHOD FOR ITS USE

(71) Applicant: Cameron International Corporation, Houston, TX (US)

(72) Inventors: Rafiqul Khan, Cypress, TX (US); Herman C. Hatfield, II, Williston, ND (US); Ankur D. Jariwala, Katy, TX (US); Gary W. Sams, Spring, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,087

(22) Filed: Jun. 27, 2023

(65) Prior Publication Data

US 2023/0349551 A1 Nov. 2, 2023

Related U.S. Application Data

(63) Continuation of application No. 15/862,270, filed on Jan. 4, 2018, now Pat. No. 11,725,813.

(51) Int. Cl.
*F23G 7/08* (2006.01)
*F23G 7/06* (2006.01)

(52) U.S. Cl.
CPC ............... *F23G 7/08* (2013.01); *F23G 7/065* (2013.01); *F05D 2240/12* (2013.01); *F23G 2204/103* (2013.01); *F23G 2207/101* (2013.01); *F23G 2207/102* (2013.01); *F23G 2207/20* (2013.01); *F23G 2207/30* (2013.01); *F23G 2209/14* (2013.01); *F23G 2209/141* (2013.01)

(58) Field of Classification Search
USPC ........................................................ 431/202
See application file for complete search history.

(56) References Cited

U.S. PATENT DOCUMENTS

| | | | |
|---|---|---|---|
| 4,082,495 | A | 4/1978 | Lefebvre |
| 4,975,042 | A | 12/1990 | Schwartz |
| 5,762,880 | A | 6/1998 | Ruhl |
| 2002/0041836 | A1 | 4/2002 | Komai |
| 2007/0169764 | A1 | 7/2007 | Lo |
| 2011/0229834 | A1 | 9/2011 | Salansky |
| 2019/0203933 | A1 | 7/2019 | Khan |

OTHER PUBLICATIONS

John Zink, Vapor Combustion System, (Brochure, 2009) 8 pages.

*Primary Examiner* — Steven B McAllister
*Assistant Examiner* — John E Bargero
(74) *Attorney, Agent, or Firm* — Jeffrey D. Frantz

(57) ABSTRACT

Disclosed herein are systems, apparatuses, and methods for using a sensed combustion zone temperature to continuously control combustion of a first (main) gas within an enclosed combustor. The combustor is in fluid communication with a first gas line carrying the first gas, a second gas line independent of the first gas line carrying a second (assist) gas having a higher heating value than the first gas, and air dampers providing draft or assist air. The first gas may be vapors from a production source or tank. A computer control system monitors the combustion zone temperature of the enclosed combustor as sensed by a sensor in electronic communication with the computer control system and controls the combustion zone temperature by changing a condition of a first gas line valve of the first gas line, a second gas line valve of the second gas line, and the air dampers.

20 Claims, 5 Drawing Sheets

VARIABLE FEED ENCLOSED COMBUSTOR SYSTEM AND METHOD FOR ITS USE

CROSS-REFERENCE TO RELATED APPLICATION

This application is a continuation of U.S. patent application Ser. No. 15/862,270, filed Jan. 4, 2018, which is expressly incorporated by reference in its entirety as if fully set forth below and for all applicable purposes.

BACKGROUND

Field

The present disclosure relates to systems, apparatuses, and methods directed to venting and combusting tank vapors like those found in oil and gas field storage tanks. More particular, the present disclosure relates to systems, apparatuses, and methods directed to improved control of, and more complete combustion of, vented gases or tank vapors under varying flow and quality conditions.

Description of the Related Art

Pressure and temperature changes can cause organic compounds such as but not limited to light hydrocarbons to vaporize inside field storage tanks. These tank vapors have low heating values and, therefore, low commercial use. As a result, the vapors are combusted using a flare or an enclosed tank vapor combustor before their release into the environment.

In many cases, a combustion zone temperature of at least about 1400° F. (760° C.) can achieve hydrocarbon destruction efficiency of 95% or greater. However, maintaining these high destruction efficiency temperatures is difficult. The heating values and the volumetric flowrates of these vapors vary widely and are often not high enough for efficient combustion, especially during startup and upset conditions. Additionally, adequate air relative to vapor feed and temperature is needed for more complete combustion. This variation in vapor feed gas rates and air requirements negatively affect performance and unburnt/partially burnt vapors are released to the environment. As a result, tank vapor combustors cannot always meet the latest federal and state emission requirements.

In an effort to maintain a steady vapor flow rate for continuous combustion, enclosed combustors use a back pressure valve located along the vapor line between the tank or vapor source and the enclosed combustor. The back pressure valve provides an obstruction to the flow along the line and, therefore, causes the upstream (back) pressure buildup inside the storage tank. This may lead to operational instability. A pilot flame is also provided for continuous source of ignition, but it does not provide enough thermal energy to rapidly increase the combustion zone temperature during startup or upset conditions, and neither does the back pressure valve.

Some enclosed combustor manufacturers attempt to maintain destruction efficiency by combining a back pressure valve along with an assist fuel gas and an assist air blower (with damper). Since the assist gas flows towards the combustor via the vapor flow line, the assist gas must overcome additional pressure drop through the burner holes, the vapor flowline must remain shut while assist gas travels along the vapor flow line into the combustion chamber. Mixing the assist gas with main tank vapor flow may be required to maintain the desired combustion efficiency but the mixture temperature may still be too low during startup and upset conditions to achieve the required destruction efficiency.

Additionally, because natural air draft combustors locate the air dampers below the burner assembly, drafting the air upward toward the burner is also a challenge. The assist gas or vapors (or both) exiting into the burner may not mix well with this drafted-up air, resulting incomplete combustion. As a result carbon monoxide and other greenhouse gases are emitted into the environment.

SUMMARY

In general, disclosed herein are systems, apparatuses, and methods for a variable feed enclosed combustor. Embodiments of the system, apparatus, and method provide continuous controlled combustion of a first (main or feed gas) gas, which may be vapors originating from a production source or tank, when the quality or quantity (or both) of the first gas varies, thereby affecting combustion zone temperature and destruction efficiency. A computer control system monitors the combustion zone temperature as detected by a sensor and maintains the combustion zone temperature at or within a predetermined target temperature range by changing a condition of a first gas line valve, a second (assist) gas line valve, an air damper regulator, or some combination thereof. The combustor may include air and gas swirling vanes to provide better mixing of air and gas for improved combustion efficiency. The second gas line may be isolated from or independent of the first gas line so that no back-pressure valve is required.

In embodiments, the computer control system adjusts the second gas line valve to permit the second gas enter into the enclosed combustor when $T<T_1$; adjusts the first gas line valve to permit the first gas to flow to the enclosed combustor when $T=T_1$; adjusts the second gas line valve to prevent the second gas from flowing to the enclosed combustor when $T=T_2$; and adjusts the air damper regulator to permit assist air to flow to—or prevent assist air from flowing into—the enclosed combustor when $T>T_2$, where:

- $T$ is a combustion zone temperature as detected by the sensor;
- $T_1$ is a first elevated combustion zone temperature limit; and
- $T_2$ is a second elevated combustion zone temperature limit.

Other embodiments may include additional combustion zone temperature limits to further control the combustion zone temperature within a narrow range.

At initial startup of the enclosed combustor, $T_0 \leq T < T_1$, where $T_0$ is an initial combustion zone temperature T. The computer control system may also actuate a pilot gas line valve to permit pilot gas to flow along a pilot gas line to the enclosed combustor and ignite the pilot flame. The pilot gas line may be independent of the first and second gas lines. After startup, and when $T_1 \leq T \leq T_2$, the control system may actuate the second gas line valve to permit the second gas to flow to the enclosed combustor and when a flow sensor detects no first gas is flowing into the enclosed combustor (although the first gas line valve is open). The control system may also provide emergency shutdown when $T=T_3$, where $T_3$ is a third different elevated combustion zone temperature limit, $T_3>T_2$.

DETAILED DESCRIPTION

Figure 1:
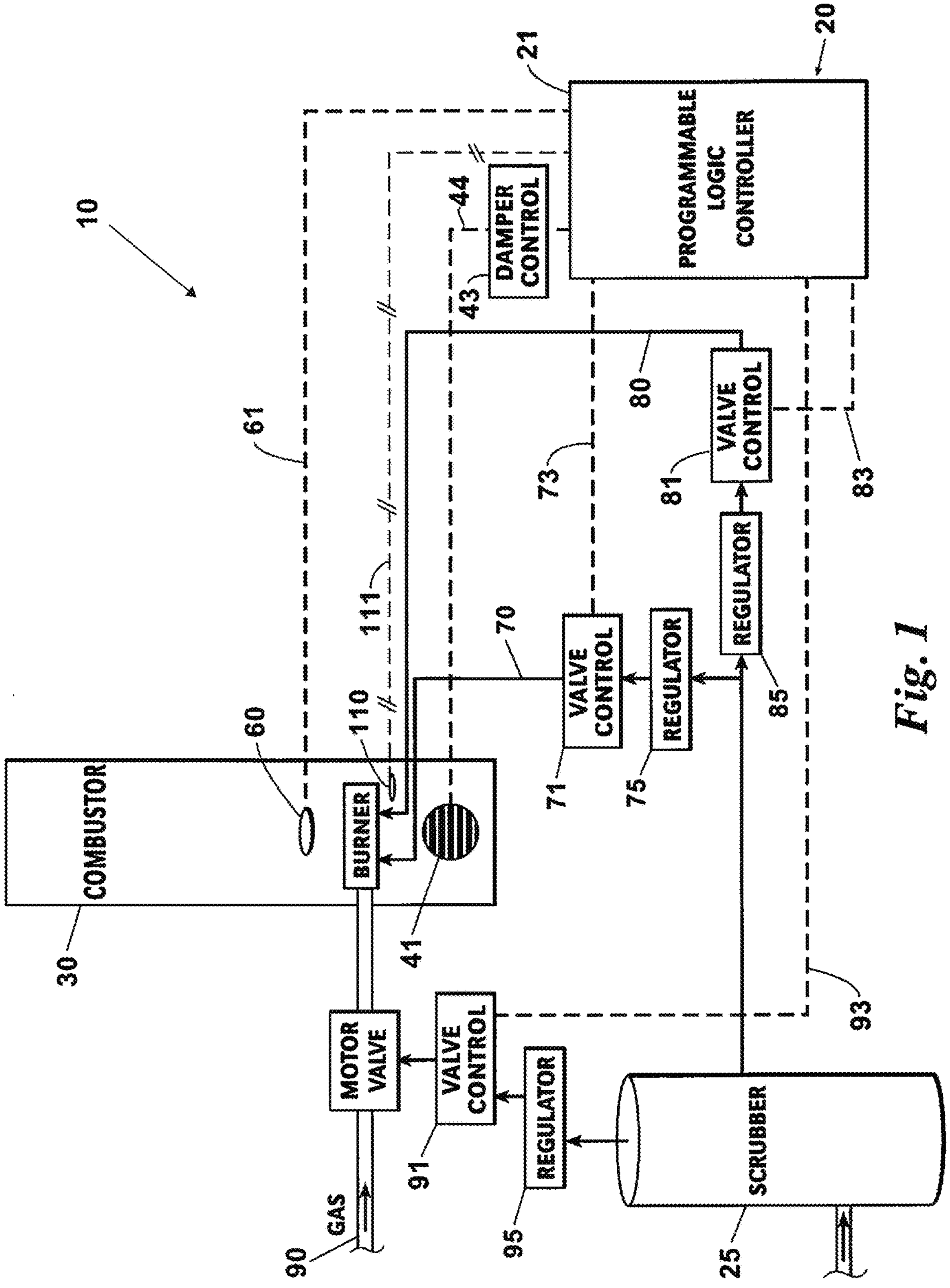
FIG. 1 is a schematic of an embodiment of a continuous controlled combustion system and process.

So that the manner in which the above recited features can be understood in detail, a more particular description may be had by reference to embodiments, some of which are illustrated in the appended drawings, wherein like reference numerals denote like elements. It is to be noted, however, that the appended drawings illustrate various embodiments and are therefore not to be considered limiting of its scope, and may admit to other equally effective embodiments.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Referring to FIG. 1, an embodiment of a variable feed combustion process control system and method 10 includes a computer control system 20 in electronic or wireless communication with, and configured to send and receive signals to and from, a pilot gas control valve 71, a first (main) gas or vapor valve control 91, a second (assist) valve control 81, and an air damper control 43. The control system 20 may include programmable logic controllers 21 or a microprocessor with non-transitory computer readable medium executed by the microprocessor.

Valve controls 71, 81, and 91 may be solenoid valves or proportional control valves. Valve 71 is connected to a pilot gas line 70 and controls a flow of pilot gas from a pilot gas source 25 into the combustor 30. Valve 81 is connected to a second (assist) gas line 80 to control the flow of assist gas into the combustor 30. The pilot and assist gas should have a higher heating value than the main gas or vapors. Valve 91 is connected to the first (main) gas or vapor line 90 and controls the flow of vapors into the combustor 30. Regulators 75, 85, and 95 help control the flow of gas to the valve controls 71, 81, 91. The air damper control 43, which may be a motorized regulator or its equivalent, adjusts the dampers 41 to affect assist air flow to the combustor 30.

A temperature sensor 60, such as but not limited to a thermocouple, senses the combustion zone temperature provides a temperature signal 61 to the control system 20. A flame ionization sensor 110 may be used to detect and monitor the pilot flame and send a flame detection signal 111 to the control system 20. The flame ionization sensor 110 may be a flame rod, a UV sensor, or an infrared sensor of a kind known in the art.

The control system 20 may continually monitor one or more of the valve signals 73, 83, 93, temperature signal 61, air damper signal 44, and flame detection signal 111 and adjust, when needed, an appropriate gas or air flow (or both). Basic principles of statistical process (quality) control may be incorporated into the control system 20 for it to decide when an adjustment should be made to the gas or air flows to maintain a predetermined or desired target combustion zone temperature (even as the vapor flow quantity and quality vary). In this way, combustion zone temperature may be maintained at or around the target temperature with any variability in combustion zone temperature falling within those predicted by statistical process control limits. In some embodiments, the tolerance limits relative to this variability provides a process capability index of at least 1.0.

A target combustion zone temperature may depend on factors that include but are not limited to the vapor or vapors mix to-be-combusted, the vapor flow rate, size of the combustor, emission targets or standards, and laws or regulations that require a certain discharge or exit temperature. For example, a current minimum discharge temperature required by US law is 1100° F. (593.3° C.). Therefore, temperature of about 2000° F. (1093.3° C.) may be suitable at or near the burner with a target combustion zone temperature of about 1400° F. (760° C.).

The combustion zone of interest may be located above the burners in a lower half or lower two-thirds of the enclosed combustor. For example, in an enclosed combustor of 20 feet in height (about 6.1 m) and having a diameter in a range of 24 inches to 60 inches (0.6096 m to 1.524 m), with burners located at about 6 feet (1.8288 m) from ground level, the combustor may experience its maximum combustion temperatures within a zone located within 3 to 4 feet above the burner (0.9144 m to 1.2192 m). The temperature within this zone may be the temperature monitored.

The control system 20 adjusts the gas and air flow to achieve and maintain a combustion zone temperature T within $T_T \pm \Delta$, where $T_T$ is a predetermined combustion zone temperature target and $\Delta$ is a predetermined tolerance spread. In other embodiments, the combustion zone temperature T is maintained within $T_T - \Delta_1$, $T_T + \Delta_2$, where $\Delta_1$ is a predetermined lower tolerance limit and $\Delta_2$ is a predetermined upper tolerance limit, $\Delta_1 \neq \Delta_2$. The control system 20 may employ statistical process control (or six sigma) techniques or methodologies to detect non-random shifts in the mean temperature, variance in temperature, or in both the mean and variance.

By way of a non-limiting example, if the combustion zone temperature T is lower than a predetermined or desired target temperature $T_T$, the control system 20 may send a signal 83 to change a condition of valve 81 to assist gas flows into the combustor 30 at a rate or volume needed to increase the combustion zone temperature T. The control system 20 may then maintain the valve 81 in this open condition as the temperature sensor 60 continues to monitor the combustion zone temperature T. If the combustion zone temperature T is higher than the target temperature $T_T$, the control system 20 may send a signal 83 to close the valve 81. The control system may also send a signal 44 to the air damper controller 43 to open or further open the dampers 41 to assist air flows into the combustor 30.

In embodiments in which the vapor flow line 90 is isolated from the assist gas flow line 80, vapor flow is not dependent on the state of the assist gas flow. The vapor flow line 90 can remain open through valve 91 while the assist gas is being provided through valve 81. This arrangement eliminates pressure buildup and, along with it, the possibility to disrupt the upstream processing units. No backpressure valve is required in this arrangement.

Figure 2A:
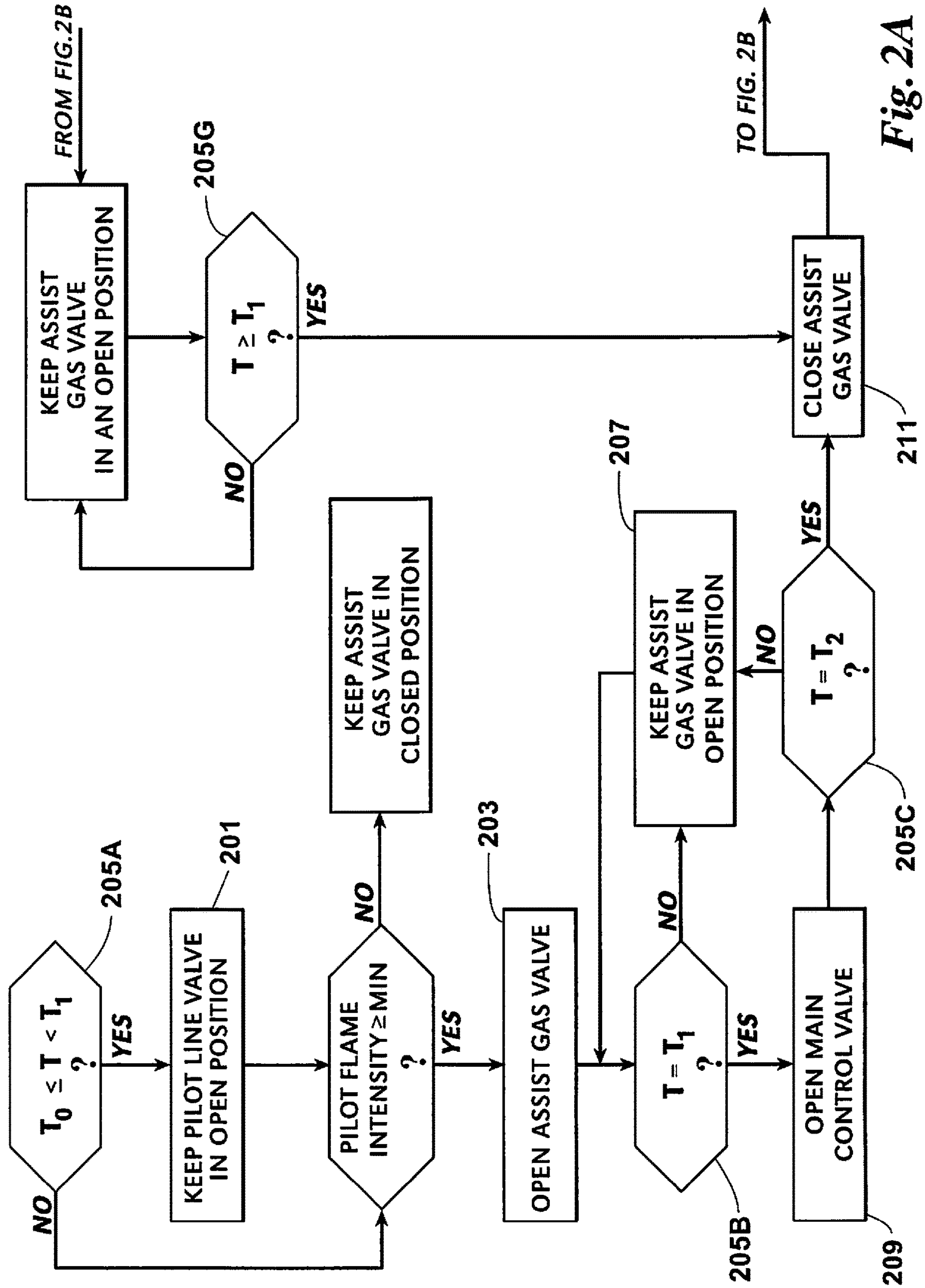
FIG. 2A-B is a process flow diagram of an embodiment.
Figure 2B:
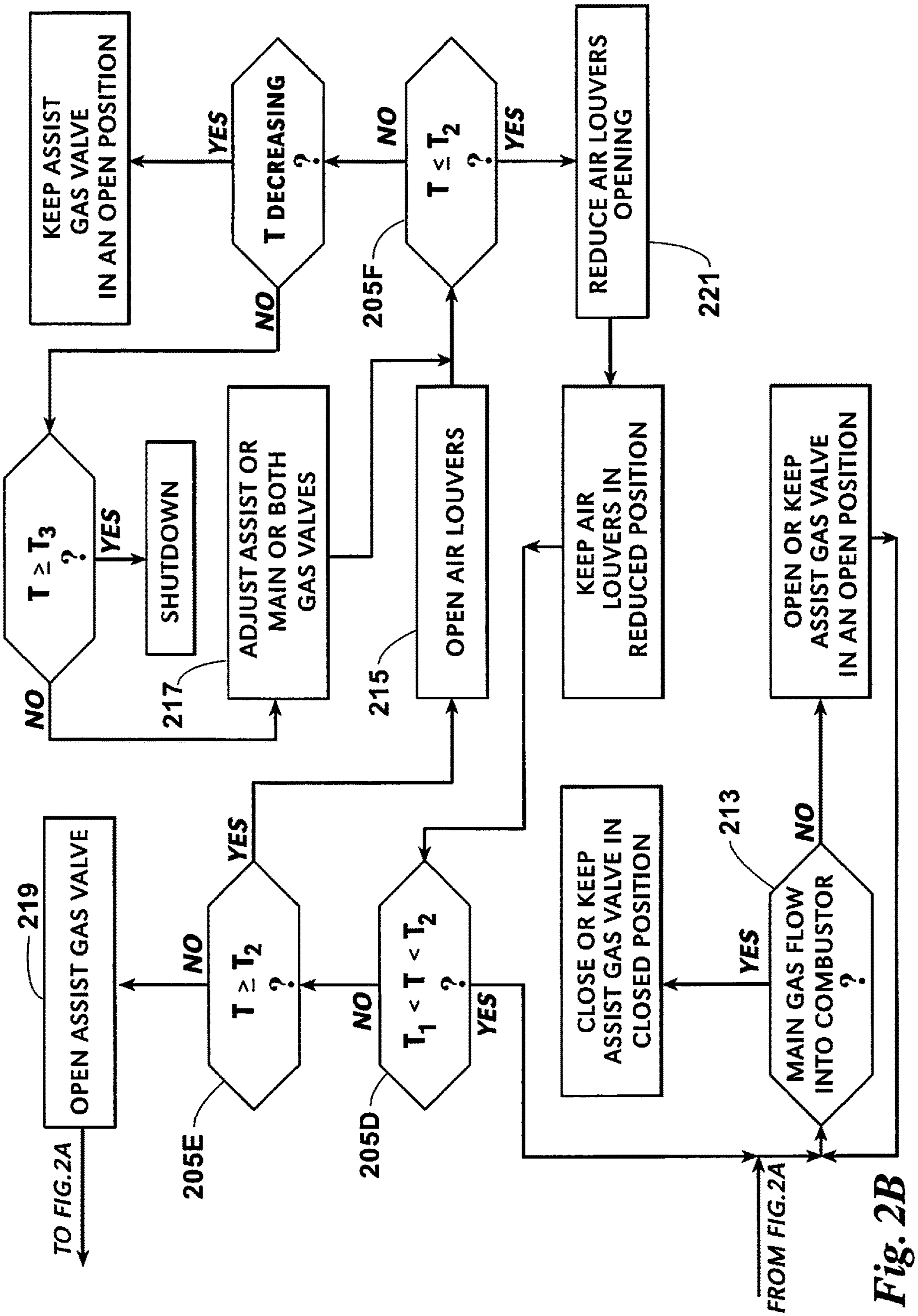

Referring now to FIGS. 2A and 2B, an embodiment may use four combustion zone temperature limits, $T_0$, $T_1$, $T_2$, $T_3$, to adjust the gas and air flows as vapor mix quality and quantity varies yet still achieve, maintain, and control the combustion zone temperature T at or around the target combustion zone temperature $T_T$, where $T_0$ is the combustion zone temperature at startup or at the onset of an upset condition;

$T_1$ is a first elevated combustion zone temperature limit, $T_0<T_1<T_T$;

$T_2$ is a second elevated combustion zone temperature limit, $T_2>T_T$;

$T_3$ is a third elevated combustion zone temperature limit, $T_3>T_2$; and $T_T$ is the temperature at which a predetermined destruction efficiency can result.

$T_3$ may be a shutdown safety limit that triggers an alarm. The minimum required discharge or exit temperature may be used to determine $T_T$. The desired destruction efficiency, which may be based on such factors as vapor content and volume and emission standards or requirements, also can be used to determine $T_T$ (which might be higher than that needed to achieve the minimum required exit temperature). For example, the target temperature $T_T$ may be set to achieve a destruction efficiency of 90%, above 90%, 95%, or above 95% such that the non-combusted portion falls within or below an emission standard or requirement for that component of the vapor. The range defined by $T_2-T_1$ may be the temperatures at which destruction efficiency remains within acceptable limits.

Additional temperature limits may be established within the range of $T_1$ to $T_2$ to achieve more precise control if required. (The same holds true for the range $T_2$ to $T_3$.) For example, once the target temperature $T_T$ is achieved, a lower limit $T_T-\Delta_1$ and upper limit $T_T+\Delta_2$ may be used to decide whether assist gas or air flow is needed when the temperature T falls below or above these limits. These upper and lower limits may be predetermined tolerance limits or statistical process control limits. In an embodiment, $T_T$ is about 1400° F. (760° C.), $T_0$ is below about 1375° F. (746.1° C.); $T_1$ is about 1375° F. (746.1° C.), $T_2$ is about 1450° F. (787.8° C.), $T_3$ is about 2100° F. (1148.9° C.). Where $T_1$ and $T_2$ are equidistant from $T_T$, $\Delta_1$ may equal $\Delta_2$, $0<\Delta_i<\frac{1}{2}(T_2-T_1)$, $\Delta_i=\Delta_1$ or $\Delta_2$.

By way of another non-limiting example, at initial startup, and with the combustion zone temperature T at $T_0$ (in a range below $T_1$), pilot gas flows through pilot line valve 71 and along pilot gas line 70 to the combustor 30. As the pilot gas burns, control system 20 adjusts the assist gas valve 81, allowing assist gas to flow along the assist gas line 80 to the combustor's burner 33. See steps 201, 203. As the assist gas burns, temperature sensor 60 monitors the combustion zone temperature T. See steps 205A-G. Pilot gas also continues to flow to the combustor 30 and, as a general rule, may continue to flow throughout operation of the combustor 30 (unless a shutdown condition is encountered). The pilot gas may be considered an "assist" gas, and may be of a same kind and quality as the assist gas flowing along assist gas line 80. However, in embodiments the pilot gas line 70 and assist gas line 80 are independent of one another. A flame ionization detector sensor 110 may be used to detect pilot flame intensity.

When the combustion zone temperature T as detected by the temperature sensor 60 reaches the first elevated temperature limit $T_1$, assist gas line valve 81 remains open, as does the pilot gas line valve 71, and the control system 20 adjusts the main gas line valve 91, allowing vapors to flow along the main gas or vapor line 90 into the combustor 30. See steps 207, 209. When the combustion zone temperature T reaches the second elevated temperature limit $T_2$, the main gas line valve 91 remains open and the control system 20 closes or adjusts the assist gas line valve 81. A flow sensor (not shown) may be used to sense and monitor flow along the main gas line 90. See steps 211, 213.

After the assist gas valve 81 is closed, any assist gas which already has entered the combustor 30 continues burning. (The same holds true if pilot gas valve 71 is closed.) The assist gas valve 81 remains closed as long as vapor continues to flow into the combustor 30 via line 90 and the combustion zone temperature T remains between $T_1$ and $T_2$. If the combustion zone temperature T falls below this range, the control system 20 adjusts the assist gas line valve 81 and the combustor 30 burns the assist gas until the temperature T reaches $T_2$. See step 219.

When the combustion zone temperature T is greater than $T_2$, the control system 20 sends a signal 44 to adjust the dampers 41 to decrease the combustion zone temperature T. See step 215. The control system 20 can also incrementally decrease the assist gas flowrate by adjusting the valve 81. If the combustion zone temperature T cannot be lowered by opening the dampers 41 or lowering the valve 81, while the temperature is remains at or approaching $T_3$, the control system 20 may shut down the assist gas line valve 81 as well as the main gas line control valve 91 (as well as the pilot gas line valve 71 if still open). See step 217. The assist gas line valve 81 should be closed if T is greater than $T_2$. The control system 20 may also open or close the dampers 41 to intermediate positions when the combustion zone temperature T is in the range $T_1$ to $T_2$. See step 221.

Figure 3:
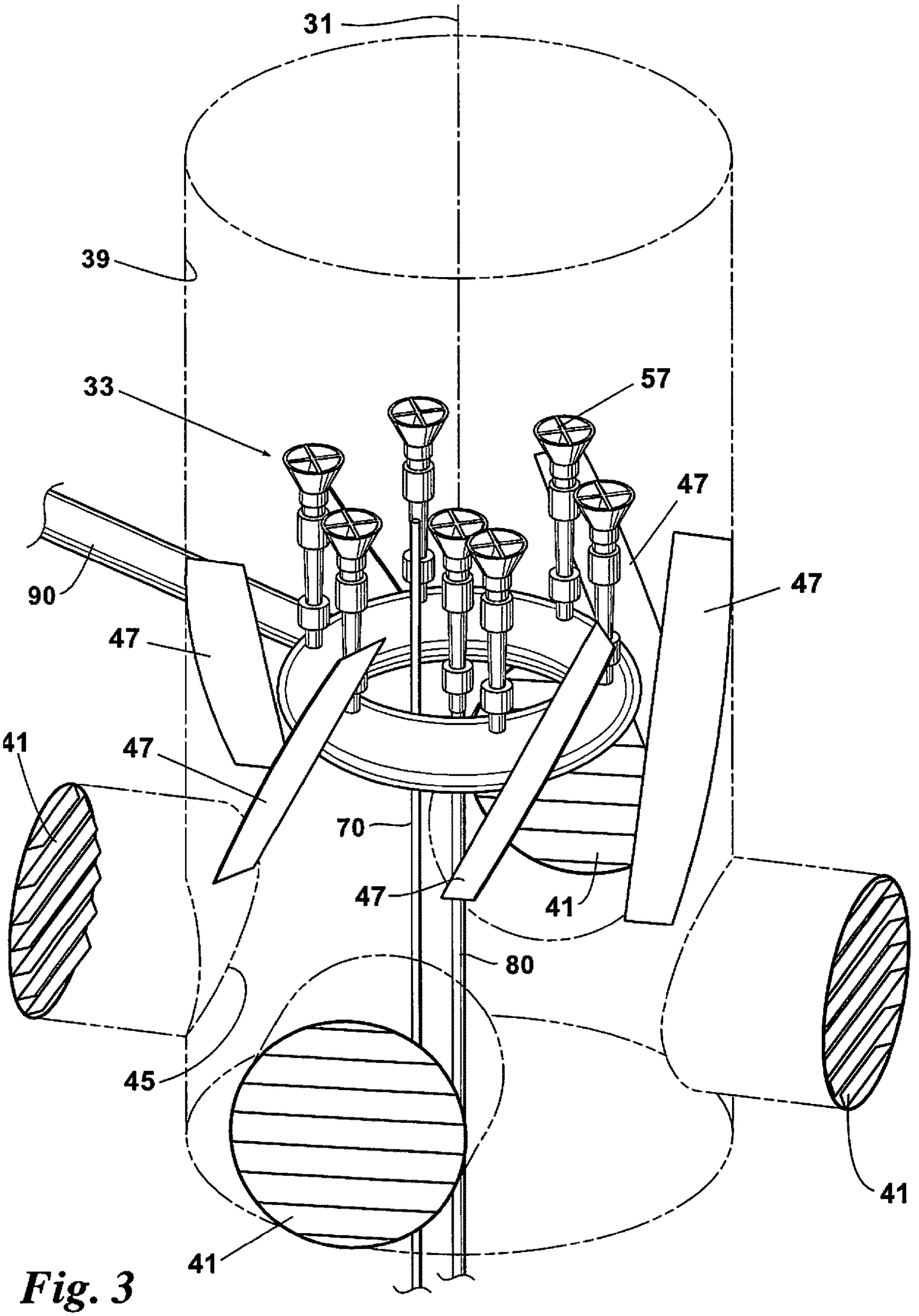
FIG. 3 is an embodiment of an enclosed combustor which may be used in the system and process. The combustor may include both air and fuel mixing vanes to enhance combustion efficiency.
Figure 4:
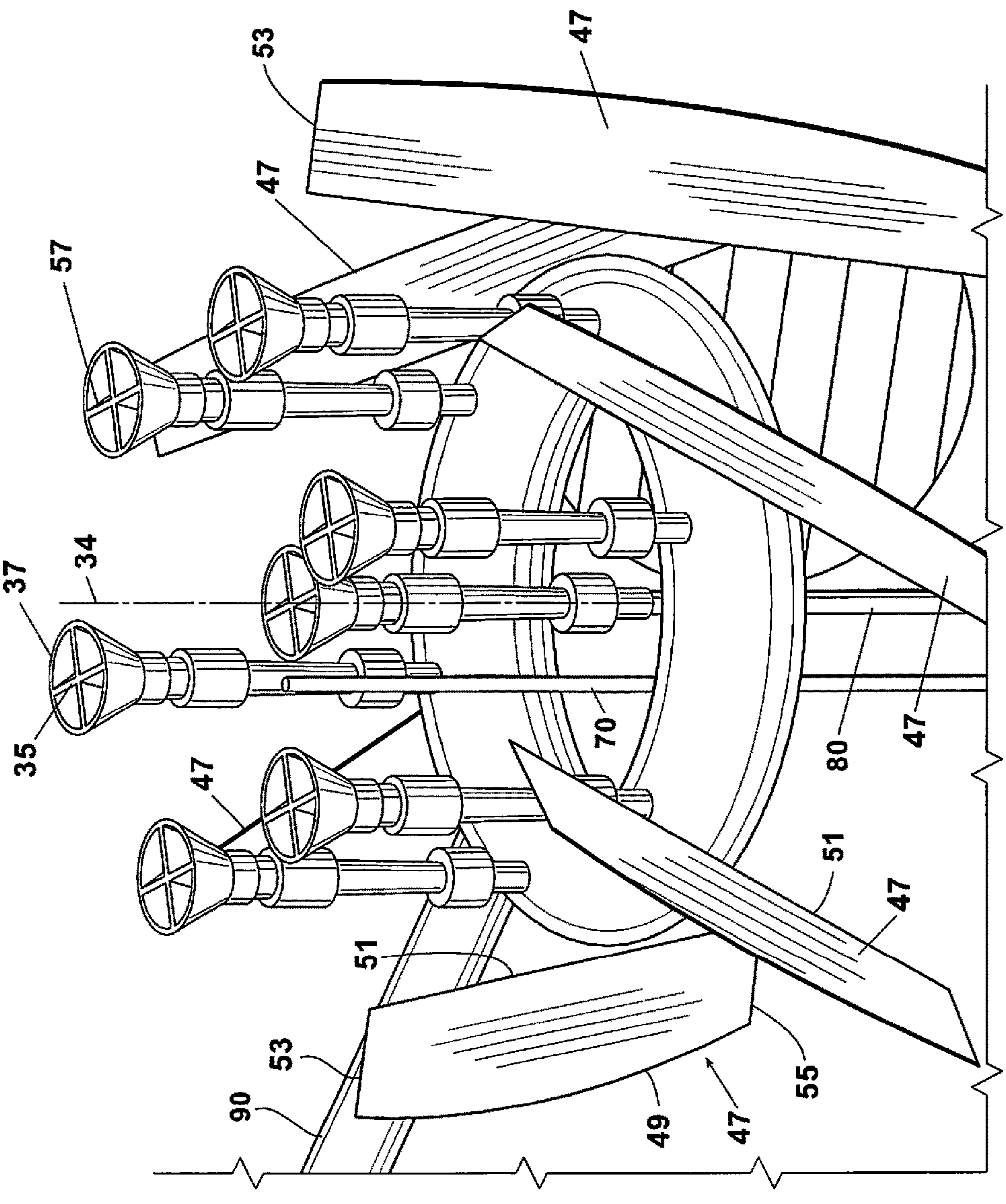
FIG. 4 is an enlarged view of the air and fuel vanes of FIG. 3.

Referring now to FIGS. 3 and 4, the combustor 30 may include air swirling vanes 47 and gas swirling vanes 57. The air swirling vanes 47 may be located on the combustor sidewalls 39 above the air dampers 41 and below the uppermost end 37 of the burner 33. The gas swirling vanes 57 are located about the burner tip 35. The combination of the air and gas swirling vanes 47, 57 provides early mixing of air and fuel and enhanced mixing of air and fuel that improves combustion efficiency and reduces the risk of unburnt fuel and carbon monoxide exiting the combustor 30 into the environment. Absent the vanes 47, 57, gas entering into the burner 33 may not mix well with the drafted-up air around the burner 33.

As the incoming assist air flow encounters the air swirling vanes 47, the air flow begins to swirl or rotate. This rotational movement can force the air to mix with the neighboring burner jets, leading to higher fuel combustion efficiency. The rotational air movement also may effectively dissipate heat from the combustor's walls 39. Dissipating heat from the walls 39 can be particularly important in the combustion zone, where wall temperatures can become greater than the designed temperature due to burner proximity, radiation, and high flame temperature. The material integrity of the combustor wall 39 can rapidly degrade under these high wall temperature conditions.

In one embodiment, the air swirling vanes 47 are inclined wall vanes in the form of flat, elongated plates or baffles that are arranged along the inner sidewall 39 of the combustor 30 to extend radially inward. The vanes 47 may be oriented at an oblique angle in a range of 15° to 45° from vertical. In an embodiment, the vanes 47 may be oriented at 30° from vertical. The wall-side edge 49 of the vane 47 may be curved to fit the curved inner wall 39 of the combustor 30, with the opposite (non-wall side) edge 51 being substantially straight. The top and bottom edges 53, 55 of the vane 47 may be straight. The number of vanes 47 may vary, with the vanes 47 spaced equidistant from one another so that the set of vanes 47 surrounds the central longitudinal axis 31 of the combustor 30.

In embodiments, the air vane 47 may be located entirely or at least partially above the air inlet 45. The top edge 53 of the vane may be located even with the uppermost end 37 of the burner tip 35 or below the uppermost end 37 with the bottom edge 55. In some embodiments, the top edge 53 may be located in a range of 12 inches to 30 inches (0.3048 m to 0.762 m) below the uppermost end 37 of the burner tip 35. In one embodiment, the top edge 53 may be located 18 inches (0.4572 m) below the uppermost end 37; in another embodiment the top edge 53 may be located 24 inches (0.6096 m) below the uppermost end 37.

In an embodiment, the gas swirling vanes 57 may be inclined baffles in the form of flat plates that are arranged about the central longitudinal axis 34 of the burner tip 35, which may be an inverted frusto-conical shape. The vanes 57 may be located entirely or at least partially above a gas exit point and toward or at the uppermost end 37 of the burner tip 35 and may be oriented at an angle in a range of 15° to 45° from vertical. In an embodiment, the vanes 57 may be oriented at 30° from vertical. The number of the vanes 57 may also vary, with the vanes 57 spaced equidistant from one another to surround the burner tip 35.

As the vapors, assist gas, or mix of assist gas and vapors exit their respective lines 70, 80, 90 and enter the burner 33, the gas swirling vanes 57 cause the gas and vapors to swirl. Additionally, the vanes 57 may help spread and mix the fuel-rich burner jets more into the neighboring air zone, thereby reducing the flame height and achieving a shorter, wider flame.

When the air and gas swirling vanes 47, 57 are used in combination with the combustion process control system and method 10, more consistent combustion of tank vapors occurs. This consistent combustion can occur under conditions of widely varying heating values and flow rates may result, including the type of varying heating values and flow rates experienced during startup periods. This more consistent combustion can achieve and maintain a desired destruction efficiency over a wide range of operating conditions. And, in embodiments in which the main and assist gas lines 90, 80 are isolated or independent of one another, the system and method does not influence the upstream separation processes. In these embodiments, no backflow pressure valve is used or required.

Dampers 41, such as louver-type dampers, may be included for adjustment of draft air to maintain a desired air-to-fuel ratio. Controlling the air-to-fuel ratio based on sensed combustion zone temperature T relative to the combustion zone temperature target $T_T$ can help maintain combustion zone temperature, achieve higher combustion efficiently (less CO), and minimize nitrous oxide ($NO_x$) production. In an embodiment, the dampers 41 may be adjusted uniformly with one control mechanism so that equal air flow is maintained through all dampers. A motorized regulator or its equivalent may be used as the control mechanism. This regulator can be adjusted as previously described to maintain a desired combustion zone temperature.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. A method for controlling continuous combustion of a first gas within an enclosed combustor, the method comprising:

providing the enclosed combustor with a plurality of combustor burners, each combustor burner comprising a burner tip delivering a fuel-rich burner jet;

monitoring at least one combustion zone temperature T using a sensor in electronic communication with a computer control system, the computer control system configured to receive signals from the sensor and send and receive signals to and from a first gas line valve, a second gas line valve, and an air damper;

controlling a flow of at least one of a first gas, a second gas, and air in response to the at least one combustion zone temperature T by adjusting at least one of the first gas line valve, the second gas line valve, and the air damper, thereby aiding combustion of the first gas;

swirling the first gas, the second gas, or a mixture of the first and second gases within the enclosed combustor with gas swirling vanes arranged about a central longitudinal axis of each burner tip of the plurality of combustor burners in the enclosed combustor, wherein the gas swirling vanes are plates; and swirling the air within the enclosed combustor with a plurality of air swirling vanes located on or adjacent to sidewalls of the enclosed combustor above the air damper and below an uppermost end of each burner tip of the plurality of combustor burners, wherein the plurality of air swirling vanes are inclined wall vanes;

wherein the first gas has a varying combustibility and the second gas has a higher heating value than the first gas; and wherein the computer control system is further configured to shut the first gas line valve and the second gas line valve when the at least one combustion zone temperature T surpasses a safety limit.

2. The method of claim 1, further comprising at least one of:

adjusting the second gas line valve to permit the second gas to flow to the enclosed combustor when $T<T_1$;

adjusting the first gas line valve to permit the first gas to flow to the enclosed combustor when $T=T_1$; and adjusting the second gas line valve to reduce the flow of the second gas to the enclosed combustor when $T=T_2$;

wherein:

$T_1$ is a first combustion zone temperature limit; and $T_2$ is a second different combustion zone temperature limit, $T_2>T_1$.

3. The method of claim 1, further comprising at least one of:

adjusting the air damper to permit the air to flow to the enclosed combustor when $T>T_2$; and adjusting the air damper to reduce the flow of the air to the enclosed combustor when $T\leq T_2$;

wherein:

$T_1$ is a first combustion zone temperature limit; and $T_2$ is a second different combustion zone temperature limit, $T_2 > T_1$.

4. The method of claim 1, further comprising:

adjusting the second gas line valve to increase the flow of the second gas to the enclosed combustor when $T_1 \leq T \leq T_2$ and when the first gas line valve is open;

wherein:

$T_1$ is a first combustion zone temperature limit; and $T_2$ is a second different combustion zone temperature limit, $T_2 > T_1$.

5. The method of claim 4, wherein adjusting the second gas line to increase the flow of the second gas occurs when a flow sensor does not detect the flow of the first gas while the first gas line valve is open.

6. The method of claim 1, further comprising:

closing the first gas line valve, the second gas line valve, or the first and second gas line valves when $T \geq T_3$;

wherein:

$T_1$ is a first combustion zone temperature limit;

$T_2$ is a second different combustion zone temperature limit, $T_2 > T_1$; and $T_3$ is a third different elevated combustion zone temperature limit, $T_3 > T_2$.

7. The method of claim 1, wherein the plurality of air swirling vanes are inclined at an oblique angle.

8. The method of claim 1, wherein each burner tip has an inverted frusto-conical shape.

9. The method of claim 1, wherein the gas swirling vanes are spaced equidistant from one another.

10. A system for controlling continuous combustion using at least one combustion zone temperature, the system comprising:

a first gas line valve connected to a first gas line arranged to transport a first gas to an enclosed combustor;

a second gas line valve connected to a second gas line arranged to carry a second gas to the enclosed combustor, the second gas having a higher heating value than the first gas;

an air damper regulator connected to an air damper arranged to control air flow into the enclosed combustor;

a sensor arranged to monitor at least one combustion zone temperature of the enclosed combustor;

a computer control system configured to monitor the at least one combustion zone temperature of the enclosed combustor as sensed by the sensor and control the at least one combustion zone temperature by adjusting the first gas line valve, the second gas line valve, and the air damper;

a plurality of combustor burners located in the enclosed combustor, each combustor burner comprising a burner tip delivering a fuel-rich burner jet;

gas swirling vanes arranged about a central longitudinal axis of each burner tip of the plurality of combustor burners in the enclosed combustor to swirl the first gas, the second gas, or a mixture of the first and second gases within the enclosed combustor, wherein the gas swirling vanes are plates; and air swirling vanes disposed in the enclosed combustor between the plurality of combustor burners and at least one sidewall of the enclosed combustor, wherein the air swirling vanes are disposed above the air damper and below an uppermost end of each burner tip to swirl the air within the enclosed combustor, wherein the air swirling vanes are inclined wall vanes;

wherein the computer control system is further configured to shut down the first gas line valve and the second gas line valve when the at least one combustion zone temperature T surpasses a safety limit.

11. The system of claim 10, wherein the gas swirling vanes include oblique oriented vanes.

12. The system of claim 10, wherein the air swirling vanes include oblique oriented vanes spaced apart from one another along the at least one sidewall of the enclosed combustor.

13. The system of claim 10, wherein each burner tip has an inverted frusto-conical shape.

14. The system of claim 10, wherein the gas swirling vanes are spaced equidistant from one another.

15. The system of claim 10, wherein the air swirling vanes are flat plates.

16. The system of claim 10, wherein the air swirling vanes are baffles.

17. A system for controlling combustion, the system comprising:

a first gas line valve connected to a first gas line arranged to transport a first gas to an enclosed combustor;

a second gas line valve connected to a second gas line arranged to carry a second gas to the enclosed combustor;

an air damper regulator connected to an air damper arranged to control air flow into the enclosed combustor;

a plurality of combustor burners located in the enclosed combustor, each combustor burner comprising a burner tip delivering a fuel-rich burner jet;

gas swirling vanes arranged about a central longitudinal axis of each burner tip of the plurality of combustor burners in the enclosed combustor to swirl the first gas, the second gas, or a mixture of the first and second gases within the enclosed combustor; and air swirling vanes disposed in the enclosed combustor around the plurality of combustor burners, wherein the air swirling vanes are disposed above the air damper and below an uppermost end of each burner tip to swirl the air within the enclosed combustor.

18. The system of claim 17, further comprising:

a pilot gas line arranged to permit a pilot gas flow along the pilot gas line to the enclosed combustor, the pilot gas line being independent of the first and second gas lines.

19. The system of claim 17, wherein the gas swirling vanes are plates and the air swirling vanes are inclined wall vanes.

20. The system of claim 17, wherein the air swirling vanes include oblique oriented vanes spaced apart from one another along an inner surface of the enclosed combustor.

* * * * *